United States Patent
Yang et al.

(10) Patent No.: US 9,225,251 B2
(45) Date of Patent: Dec. 29, 2015

(54) DUTY CYCLE CONTROL METHOD, POWER SUPPLY SYSTEM AND POWER CONVERTER USING THE SAME

(71) Applicant: DELTA ELECTRONICS, INC., Taoyuan Hsien (TW)

(72) Inventors: Zhongwang Yang, Pudong Shanghai (CN); Guojun Xu, Pudong Shanghai (CN); Guisong Huang, Pudong Shanghai (CN)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 149 days.

(21) Appl. No.: 13/921,363

(22) Filed: Jun. 19, 2013

(65) Prior Publication Data

US 2013/0279204 A1 Oct. 24, 2013

Related U.S. Application Data

(63) Continuation-in-part of application No. 12/845,898, filed on Jul. 29, 2010, now Pat. No. 8,787,040.

(60) Provisional application No. 61/229,376, filed on Jul. 29, 2009.

(30) Foreign Application Priority Data

Sep. 21, 2012 (CN) .......................... 2012 1 0357145

(51) Int. Cl.
*H02M 3/335* (2006.01)
*H02M 1/00* (2007.01)

(52) U.S. Cl.
CPC ...... *H02M 3/33507* (2013.01); *H02M 3/33576* (2013.01); *H02M 3/33592* (2013.01); *H02M 2001/0022* (2013.01)

(58) Field of Classification Search
CPC ............ H02M 3/335; H02M 3/33507; H02M 3/33515; H02M 3/33523; H02M 3/3353; H02M 3/33538; H02M 3/33546; H02M 3/33553; H02M 3/33576; H02M 3/33592
USPC .......................... 323/234, 237, 265, 282–285
See application file for complete search history.

(56) References Cited

U.S. PATENT DOCUMENTS

| 6,278,263 | B1 | 8/2001 | Walters et al. |
| 6,944,034 | B1 | 9/2005 | Shteynberg et al. |

(Continued)

FOREIGN PATENT DOCUMENTS

| JP | H11187662 | 7/1999 |
| JP | 2000-139079 | 5/2000 |
| WO | 2009069647 | 6/2009 |

*Primary Examiner* — Jeffrey Gblende
(74) *Attorney, Agent, or Firm* — Kirton McConkie; Evan R. Witt

(57) ABSTRACT

A power converter includes a power module, a feedback module, and a control module. The power module is used for converting an input voltage into an output voltage. The feedback module is electrically connected with the power module for generating a feedback voltage according to the output voltage. The control module is electrically connected with the feedback module and the power module for comparing a reference duty cycle value with a duty cycle, generating a variable reference voltage according to the comparison between the reference duty cycle value and the duty cycle, comparing the variable reference voltage with the feedback voltage, and adjusting the duty cycle according to the comparison between the variable reference voltage and the feedback voltage.

11 Claims, 6 Drawing Sheets

(56) References Cited

U.S. PATENT DOCUMENTS

| | | |
|---|---|---|
| 7,215,108 B2 * | 5/2007 | Inn et al. .................. 323/285 |
| 7,280,376 B2 | 10/2007 | McDonald et al. |
| 8,098,506 B2 | 1/2012 | Saint-Pierre |
| 8,320,145 B2 | 11/2012 | Horii |
| 2005/0286271 A1 | 12/2005 | Vinciarelli |
| 2007/0257643 A1 * | 11/2007 | Chen et al. ............... 323/222 |
| 2008/0193150 A1 | 8/2008 | Matsumoto |
| 2008/0247194 A1 | 10/2008 | Ying et al. |
| 2008/0266907 A1 | 10/2008 | Kim et al. |
| 2008/0278125 A1 * | 11/2008 | Pigott .................. 323/271 |
| 2009/0039841 A1 * | 2/2009 | Fabbro .................. 323/271 |
| 2010/0123446 A1 * | 5/2010 | Cheng et al. ............ 323/288 |
| 2010/0253302 A1 * | 10/2010 | Otte et al. ............... 323/282 |

* cited by examiner

DUTY CYCLE CONTROL METHOD, POWER SUPPLY SYSTEM AND POWER CONVERTER USING THE SAME

CROSS-REFERENCE TO RELATED APPLICATIONS

The present application is a continuation-in-part of U.S. patent application Ser. No. 12/845,898 entitled "VOLTAGE-REGULATING CIRCUIT WITH INPUT VOLTAGE DETECTING CIRCUIT AND PARALLEL VOLTAGE-REGULATING CIRCUIT SYSTEM USING THE SAME" filed on Jul. 29, 2010, which claims the benefit of U.S. Provisional Application No. 61/229,376, filed on Jul. 29, 2009, and entitled "A HIGH EFFICIENCY POWER CONVERTER", the entirety of which is hereby incorporated by reference. This application also claims priority benefits of CN application serial No. 201210357145.8, filed on Sep. 21, 2012, the disclosures of which are incorporated herein by reference.

FIELD OF THE INVENTION

The present invention relates to a power supply system, and more particularly to a power converter of a power supply system.

BACKGROUND OF THE INVENTION

In a conventional embedded power supply, a printed circuit board (PCB) with multiple thick copper layers and a special process of surface-mounting power devices are usually employed to reduce the overall volume and increase the reliability. Consequently, the embedded power supply is widely used in wireless networks, fiber-optic network apparatuses, servers and data storage devices.

Generally, when a full-regulated converter is applied to the conventional embedded power supply, the efficiency of the full-regulated converter is restricted and fails to be effectively enhanced. For example, in the full-regulated converter, the output voltage from the power module is fed back and compared with a fixed reference voltage. According to the comparing result, a control module adjusts a driving signal. According to the driving signal, the output voltage of the power module is correspondingly adjusted. Consequently, the magnitude of the output voltage is determined according to the comparison between the fixed reference voltage and the feedback voltage. Moreover, for allowing the power module to generate a corresponding output voltage according to the input voltage, the turn ratio of the transformer of the power module should be very small. Consequently, at the minimum input voltage, the power module can still generate the output voltage corresponding to the fixed reference voltage. Under this circumstance, the power module can be operated in the full-regulated status. However, if the turn ratio of the transformer of the power module is too large, the power module fails to generate the output voltage corresponding to the fixed reference voltage. Under this circumstance, the feedback adjusting function of the power module according to the output voltage will be lost.

Due to the limitation of the turn ratio of the transformer, when the power module is operated at a high input voltage, the output inductor is usually subjected to a very high volt-second value (V×t). Consequently, the output inductor should have a large-sized magnetic core or more winding turns. Under this circumstance, the power density of the power module is limited and the power module fails to be enhanced.

SUMMARY OF THE INVENTION

The present invention provides a power supply system, a power converter, and a voltage regulating method. As the input voltage is increased, the output voltage converted from the input voltage is gradually adjusted. Consequently, the output inductor is subjected to a reduced volt-second value.

In accordance with an aspect of the present invention, there is provided a power converter. The power converter includes a power module, a feedback module, and a control module. The power module is used for converting an input voltage into an output voltage. The feedback module is electrically connected with the power module for generating a feedback voltage according to the output voltage. The control module is electrically connected with the feedback module and the power module for comparing a reference duty cycle value with a duty cycle, generating a variable reference voltage according to the comparison between the reference duty cycle value and the duty cycle, comparing the variable reference voltage with the feedback voltage, and adjusting the duty cycle according to the comparison between the variable reference voltage and the feedback voltage.

In an embodiment, when the input voltage is changed, the variable reference voltage is adjusted by the control module, the duty cycle is correspondingly adjusted by the control module, and a driving control signal corresponding to the adjusted duty cycle is generated by the control module so as to control the power module.

In an embodiment, the control module further comprises a first comparing circuit and a first computing circuit. The first comparing circuit is used for comparing the reference duty cycle value with the duty cycle, thereby generating an error duty cycle. The first computing circuit is electrically connected with the first comparing circuit for computing the error duty cycle, thereby generating and adjusting the variable reference voltage.

In an embodiment, the control module further comprises a second comparing circuit, a second computing circuit, and a driving signal generator. The second comparing circuit is electrically connected with the first computing circuit and the feedback module for comparing the variable reference voltage with the feedback voltage, thereby generating an error voltage. The second computing circuit is electrically connected with the second comparing circuit for computing the error voltage, thereby generating and adjusting the duty cycle. The driving signal generator is electrically connected with the second computing circuit and the power module for receiving the duty cycle from the second computing circuit and generating the driving control signal corresponding to the duty cycle.

In an embodiment, the first comparing circuit is electrically connected with the second computing circuit for receiving the duty cycle from the second computing circuit.

In an embodiment, the first comparing circuit is electrically connected with the driving signal generator for retrieving the duty cycle from the driving signal generator.

In an embodiment, after the driving control signal for controlling the power module is outputted from the control module, the driving control signal is fed back to the control module. The fed-back driving control signal is received by the first comparing circuit, so that the corresponding duty cycle is retrieved from the driving control signal.

In an embodiment, when the input voltage is increased, the variable reference voltage is gradually increased, and the duty cycle is gradually increased by the control module.

In accordance with another aspect of the present invention, there is provided a power supply system. The power supply system includes a high voltage bus, a low voltage bus, a power converter, and a plurality of supply voltage generation circuits. The power converter is electrically connected between the high voltage bus and the low voltage bus and comprises a control module for comparing a reference duty cycle value with a duty cycle, generating a variable reference voltage according to the comparison between the reference duty cycle value and the duty cycle, adjusting the duty cycle according to the comparison between the variable reference voltage and a feedback voltage, and generating a driving control signal corresponding to the adjusted duty cycle, thereby adjusting an output voltage from the power converter. The supply voltage generation circuits are electrically connected with each other in parallel and electrically connected to the low voltage bus for converting the output voltage into respective supply voltages, thereby providing to corresponding loads.

In an embodiment, the control module of the power converter further comprises a first comparing circuit and a first computing circuit. The first comparing circuit is used for comparing the reference duty cycle value with the duty cycle, thereby generating an error duty cycle. The first computing circuit is electrically connected with the first comparing circuit for computing the error duty cycle, thereby generating and adjusting the variable reference voltage.

In an embodiment, the control module of the power converter further comprises a second comparing circuit, a second computing circuit, and a driving signal generator. The second comparing circuit is electrically connected with the first computing circuit and the feedback module for comparing the variable reference voltage with the feedback voltage, thereby generating an error voltage. The second computing circuit is electrically connected with the second comparing circuit for computing the error voltage, thereby generating and adjusting the duty cycle. The driving signal generator is electrically connected with the second computing circuit for receiving the duty cycle from the second computing circuit and generating the driving control signal corresponding to the duty cycle.

In an embodiment, the first comparing circuit is electrically connected with the second computing circuit for receiving the duty cycle from the second computing circuit.

In an embodiment, the first comparing circuit is electrically connected with the driving signal generator for retrieving the duty cycle from the driving signal generator.

In an embodiment, after the driving control signal is outputted from the control module, the driving control signal is fed back to the control module, wherein the fed-back driving control signal is received by the first comparing circuit, so that the corresponding duty cycle is retrieved from the driving control signal.

In an embodiment, when an input voltage of the power converter is changed, the variable reference voltage is adjusted by the control module. When the input voltage is increased, the variable reference voltage is increased, the duty cycle is gradually increased by the control module, and the output voltage is gradually increased according to the driving control signal.

In accordance with a further aspect of the present invention, there is provided a voltage regulating method. Firstly, a duty cycle is compared with a reference duty cycle value. Then, a variable reference voltage is generated according to the comparison between the duty cycle and the reference duty cycle value. Then, the variable reference voltage is compared with a feedback voltage. Then, the duty cycle is adjusted according to the comparison between the variable reference voltage and the feedback voltage. An input voltage is converted into an adjusted output voltage by a power module according to a driving control signal corresponding to the adjusted duty cycle.

In an embodiment, the duty cycle is generated and adjusted by a computing circuit.

In an embodiment, the driving control signal is generated by a driving signal generator, and the duty cycle to be compared with the reference duty cycle value is retrieved from the driving signal generator.

In an embodiment, the duty cycle to be compared with the reference duty cycle value is retrieved from the driving control signal.

In an embodiment, when the input voltage is changed, the variable reference voltage is correspondingly adjusted. When the input voltage is increased, the variable reference voltage is gradually increased, and the duty cycle is adjusted to be gradually increased.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Unless limited otherwise, the terms "connected" or "coupled" are used broadly and encompass direct and indirect connections or couplings of two or more components.

Figure 1:
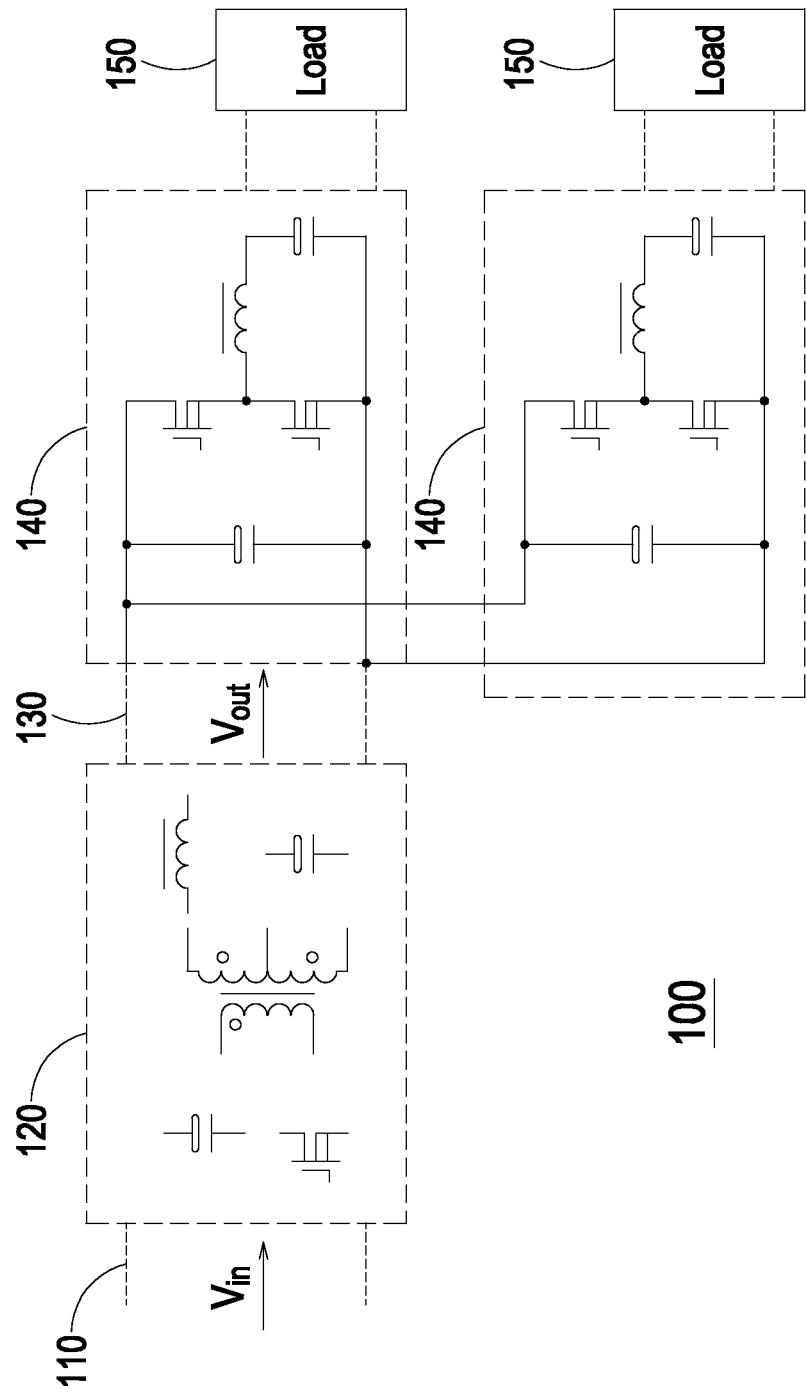
FIG. 1 is a schematic circuit diagram illustrating a power supply system according to an embodiment of the present invention.

FIG. 1 is a schematic circuit diagram illustrating a power supply system according to an embodiment of the present invention. As shown in FIG. 1, the power supply system 100 comprises a high voltage bus 110, a power converter 120, a low voltage bus 130, and a plurality of supply voltage generation circuits 140. The power converter 120 is electrically connected between the high voltage bus 110 and the low voltage bus 130. An input voltage $V_{in}$ is received by the power converter 120 through the high voltage bus 110. Moreover, the input voltage $V_{in}$ is converted into an output voltage $V_{out}$ by the power converter 120, and the output voltage $V_{out}$ is transmitted through the low voltage bus 130. The supply voltage generation circuits 140 are electrically connected with each other in parallel and electrically connected to the low voltage bus 130. The supply voltage generation circuits 140 are used for converting the output voltage $V_{out}$ into respective supply voltages, thereby providing to corresponding loads 150.

Figure 2:
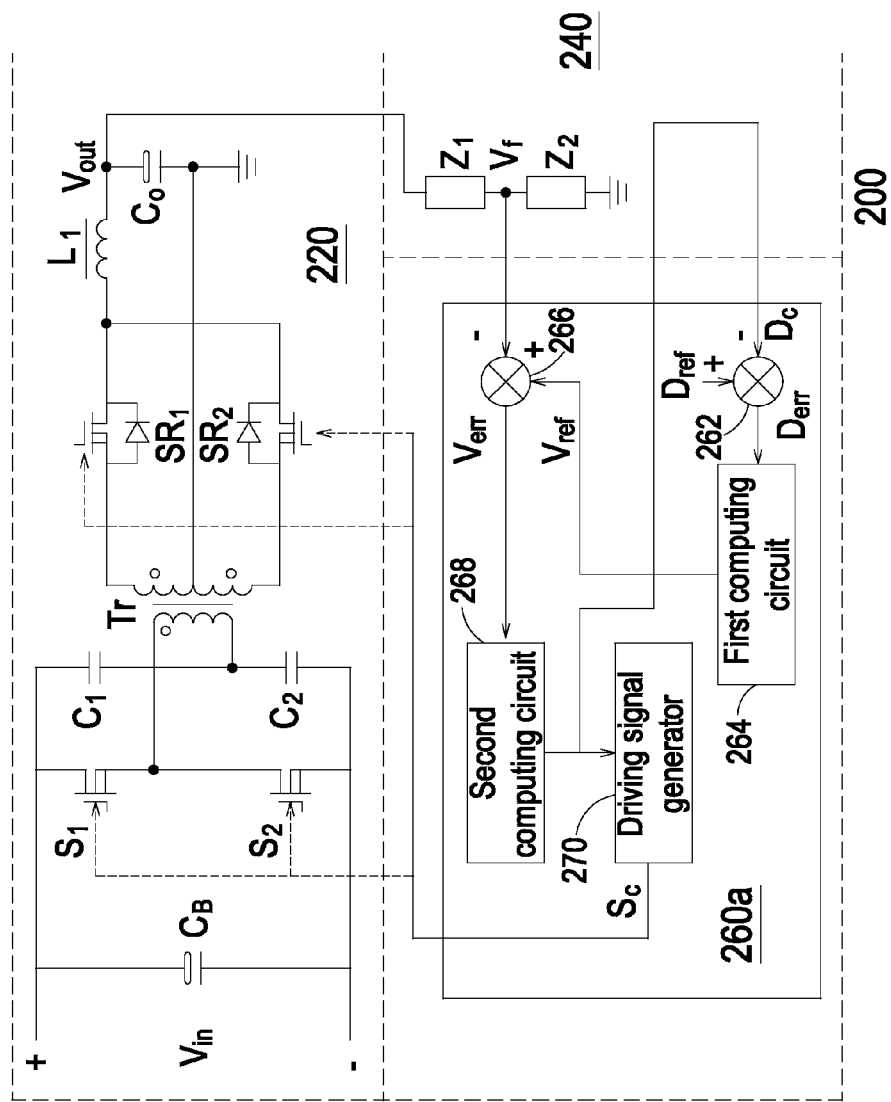
FIG. 2 is a schematic circuit diagram illustrating a first exemplary power converter used in the power supply system of FIG. 1.

FIG. 2 is a schematic circuit diagram illustrating a first exemplary power converter used in the power supply system of FIG. 1. The power converter 200 of FIG. 2 may be applied to the power supply system 100 of FIG. 1, but is not limited thereto. As shown in FIG. 2, the power converter 200 comprises a power module 220, a feedback module 240, and a control module 260a. The power module 220 is used for converting the input voltage $V_{in}$ into the output voltage $V_{out}$. The feedback module 240 is electrically connected with the power module 220 for generating a feedback voltage $V_f$ corresponding to the output voltage $V_{out}$. The control module 260a is electrically connected with the feedback module 240 and the power module 220 for comparing a reference duty cycle value $D_{ref}$ and a duty cycle $D_c$. According to the comparison between the reference duty cycle value $D_{ref}$ and the duty cycle $D_c$, the control module 260a generates a corresponding variable reference voltage $V_{ref}$. Moreover, according to the comparison between the variable reference voltage $V_{ref}$ and the feedback voltage $V_f$, the control module 260a correspondingly adjusts the duty cycle value $D_c$. According to the practical requirements, the reference duty cycle value $D_{ref}$ may be set as a constant value or a constant ratio (e.g. 50%).

In this context, it is to be noted that the reference duty cycle value $D_{ref}$ and the duty cycle $D_c$ may indicate values or signals corresponding to the values. In other words, the control module 260a may receive two signals corresponding to the reference duty cycle value $D_{ref}$ and the duty cycle $D_c$ and compare these two signals.

In an embodiment, as the input voltage $V_{in}$ is changed, the control module 260a will adjust the variable reference voltage $V_{ref}$, thereby correspondingly adjusting the duty cycle $D_c$. Moreover, according to the adjusted duty cycle $D_c$, the control module 260a generates a corresponding driving control signal $S_c$. Since the conversion of the input voltage $V_{in}$ by the power module 220 is correspondingly controlled, the output voltage $V_{out}$ from the power converter 200 will be correspondingly adjusted.

In practice, the control module 260a or the following control module (e.g. the control module 260b of FIG. 4 or the control module 260c of FIG. 5) may be implemented by a digital controller (or a control chip) or an analog controller (or a control chip).

Please refer to FIG. 2 again. The power module 220 comprises a first switch element $S_1$, a second switch element $S_2$, a first capacitive voltage divider $C_1$, a second capacitive voltage divider $C_2$, a transformer Tr, a first rectifier switch $SR_1$, a second rectifier switch $SR_2$, a filtering inductor $L_1$, and a filtering capacitor $C_o$. The first switch element $S_1$ and the second switch element $S_2$ are electrically connected with the first capacitive voltage divider $C_1$ and the second capacitive voltage divider $C_2$ in parallel. Moreover, according to a driving control signal $S_c$ from the control module 260a, the first switch element $S_1$ and the second switch element $S_2$ are controlled to be conducted (or turned on) or shut off (or turned off). The first capacitive voltage divider $C_1$ and the second capacitive voltage divider $C_2$ are connected with each other in series. By the first capacitive voltage divider $C_1$ and the second capacitive voltage divider $C_2$, the input voltage $V_{in}$ is subjected to voltage division. Consequently, a divided voltage is provided to a primary winding of the transformer Tr. The first rectifier switch $SR_1$ and the second rectifier switch $SR_2$ are connected with a secondary winding of the transformer Tr for performing synchronous rectification. The filtering inductor $L_1$ and the filtering capacitor $C_o$ are serially connected with the first rectifier switch $SR_1$ for filtering. In an embodiment, the power module 220 further comprises a filtering capacitor $C_B$ electrically connected with the first switch element $S_1$ and the second switch element $S_2$ in parallel for filtering.

The feedback module 240 comprises a first impedance $Z_1$ and a second impedance $Z_2$. By the first impedance $Z_1$ and the second impedance $Z_2$, the output voltage $V_{out}$ is subjected to voltage division. Consequently, a feedback voltage $V_f$ corresponding to the output voltage $V_{out}$ is generated.

Alternatively, in some other embodiments, the output current corresponding to the output voltage $V_{out}$ may be subjected to current division by the feedback module 240. Consequently, a feedback current signal corresponding to the output current is generated. By comparing the feedback current signal with a variable reference current signal, the control module 260a adjusts duty cycle according to the comparing result. The variable reference current signal may be determined according to the comparison between the reference duty cycle value and the duty cycle. In other words, the feedback signal generated by the feedback module 240 may be a feedback voltage signal or a feedback current signal. Moreover, the function and operation of the control module 260a may be correspondingly adjusted according to the feedback voltage signal or the feedback current signal.

The control module 260a comprises a first comparing circuit 262, a first computing circuit 264, a second comparing circuit 266, a second computing circuit 268, and a driving signal generator 270. The first comparing circuit 262 is used for comparing the reference duty cycle value $D_{ref}$ with the duty cycle $D_c$, thereby generating an error duty cycle $D_{err}$. The first computing circuit 264 is electrically connected with the first comparing circuit 262 for computing the error duty cycle $D_{err}$, thereby generating and adjusting the variable reference voltage $V_{ref}$. The second comparing circuit 266 is electrically connected with the first computing circuit 264 and the feedback module 240 for comparing the variable reference voltage $V_{ref}$ with the feedback voltage $V_f$ from the feedback module 240, thereby generating an error voltage $V_{err}$. The second computing circuit 268 is electrically connected with the second comparing circuit 266 for computing the error voltage $V_{err}$, thereby generating and adjusting the duty cycle $D_c$. The driving signal generator 270 is electrically connected with the second computing circuit 268 and the power module 220 for receiving the duty cycle $D_c$ from the second computing circuit 268 and generating the driving control signal $S_c$ corresponding to the duty cycle $D_c$.

In this embodiment, the first comparing circuit 262 is electrically connected with the second computing circuit 268 for receiving the duty cycle $D_c$ from the second computing circuit 268. The duty cycle $D_c$ is generated and adjusted by the second computing circuit 268. Moreover, the adjusted duty cycle $D_c$ is further fed back to the first comparing circuit 262 in order to be compared with the reference duty cycle value $D_{ref}$.

Figure 3:
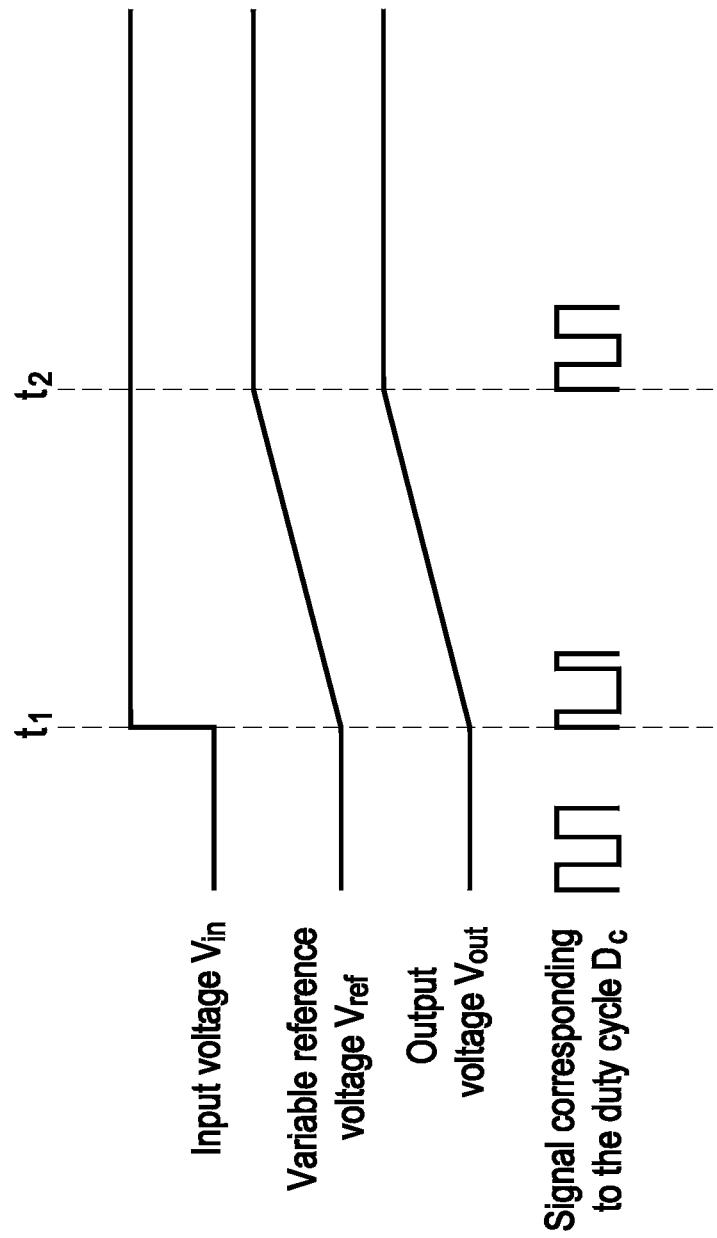
FIG. 3 is a schematic timing waveform diagram illustrating the input voltage, the variable reference voltage, the output voltage and the signal corresponding to the duty cycle processed in the power converter of FIG. 2.

FIG. 3 is a schematic timing waveform diagram illustrating the input voltage, the variable reference voltage, the output voltage and the signal corresponding to the duty cycle processed in the power converter of FIG. 2. Please refer to FIGS. 2 and 3. At the time point $t_1$, the input voltage $V_{in}$ is increased or changed to a high-level state. Since the variable reference voltage $V_{ref}$ fails to be immediately changed in the short time, the control module 260a will reduce the duty cycle $D_c$. For example, the duty cycle $D_c$ is adjusted to be smaller than the reference duty cycle value $D_{ref}$. Under this circumstance, the output voltage $V_{out}$ is not changed immediately. As the duty cycle $D_c$ is gradually increased, the output voltage $V_{out}$ and the corresponding feedback voltage $V_f$ are changed with the variable reference voltage $V_{ref}$.

From the time point $t_1$ to the time point $t_2$, the duty cycle $D_c$ is smaller than the reference duty cycle value $D_{ref}$. After the fed-back duty cycle $D_c$ is compared and computed, the variable reference voltage $V_{ref}$ is gradually increased by the first computing circuit 264 according to the comparing result and the computing result. As the variable reference voltage $V_{ref}$ is gradually increased, the variable reference voltage $V_{ref}$ is equal to the feedback voltage $V_f$ at the time point $t_2$. Moreover, after the gradually-increased variable reference voltage $V_{ref}$ is compared and computed, the duty cycle $D_c$ is gradually increased by the second computing circuit 268 according to the comparing result and the computing result. As the duty cycle $D_c$ is gradually increased, the duty cycle $D_c$ is equal to the reference duty cycle value $D_{ref}$ at the time point $t_2$.

Moreover, according to the duty cycle $D_c$ that is changed from the time point $t_1$ to the time point $t_2$, the driving signal generator 270 generates the driving control signal $S_c$. According to the driving control signal $S_c$, the power module 220 adjusted the output voltage $V_{out}$. At the time point $t_2$, the adjusted output voltage $V_{out}$ is increased to a constant value. Consequently, the power converter 200 is in a steady state.

From the above discussions, the variable reference voltage $V_{ref}$ is changed by adjusting the duty cycle $D_c$. As the input voltage $V_{in}$ is changed, the output voltage $V_{out}$ from the power converter 200 is not changed immediately, but the output voltage $V_{out}$ is changed with the variable reference voltage $V_{ref}$. That is, if the input voltage $V_{in}$ is changed, the output voltage $V_{out}$ can be gradually adjusted by the power converter 200. Under this circumstance, the output inductor is subjected to a reduced volt-second value (V×t). Since the output inductor does not need to have a large-sized magnetic core or more winding turns, the power density of the power module 220 is increased, and the efficiency of the power converter is enhanced.

Figure 4:
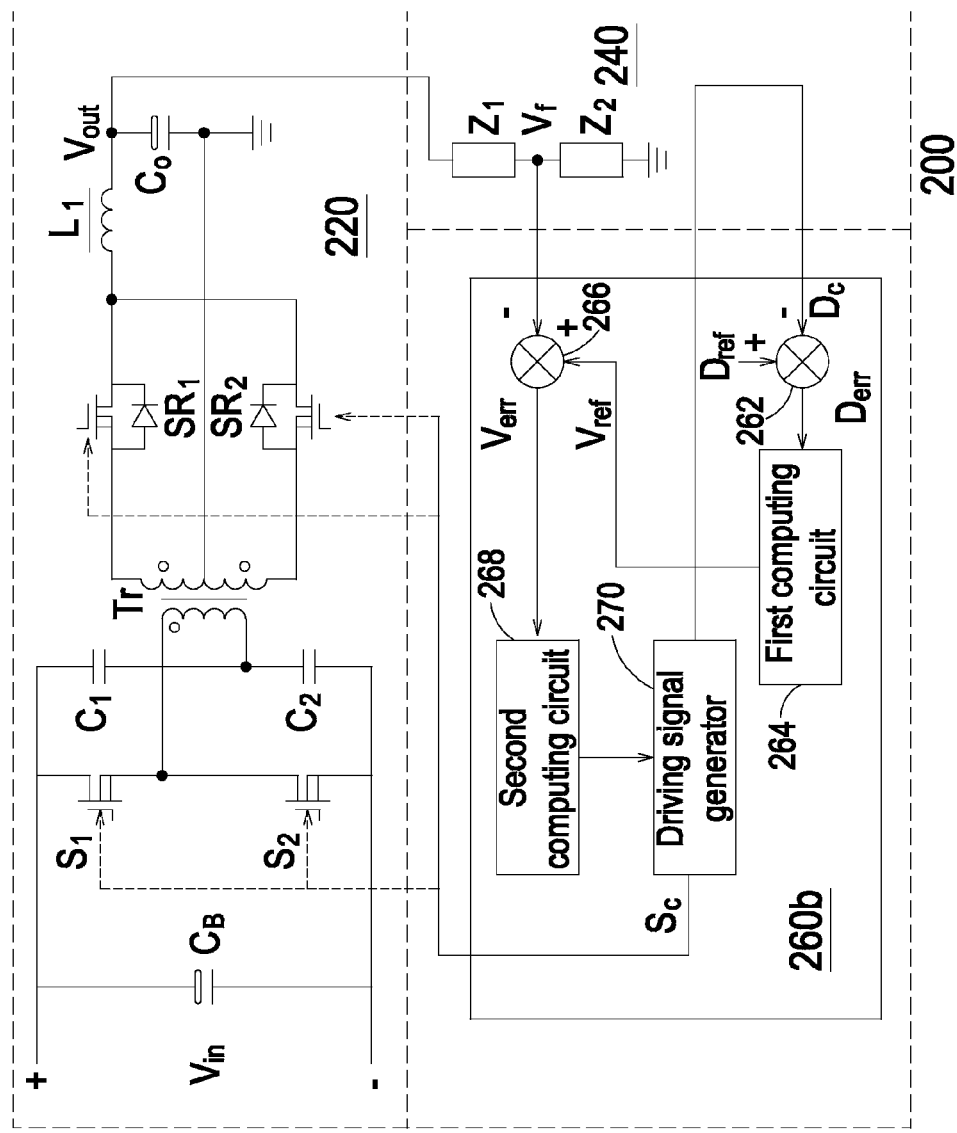
FIG. 4 is a schematic circuit diagram illustrating a second exemplary power converter used in the power supply system of FIG. 1.

FIG. 4 is a schematic circuit diagram illustrating a second exemplary power converter used in the power supply system of FIG. 1. As shown in FIG. 4, the power converter 200 comprises a power module 220, a feedback module 240, and a control module 260b. In comparison with FIG. 2, the control module 260b is distinguished. In the control module 260b of this embodiment, the first comparing circuit 262 is electrically connected with the driving signal generator 270 for retrieving the duty cycle $D_c$ from the driving signal generator 270. Moreover, the duty cycle $D_c$ retrieved from the driving signal generator 270 is compared with the reference duty cycle value $D_{ref}$ by the first comparing circuit 262.

The operations of the control module 260b and the relationship between the control module 260b, the power module 220 and the feedback module 240 are similar to those of FIG. 2, and are not redundantly described herein. The operations of the components of the control module 260b and the relationships between these components are similar to those of FIG. 2, and are not redundantly described herein.

Figure 5:
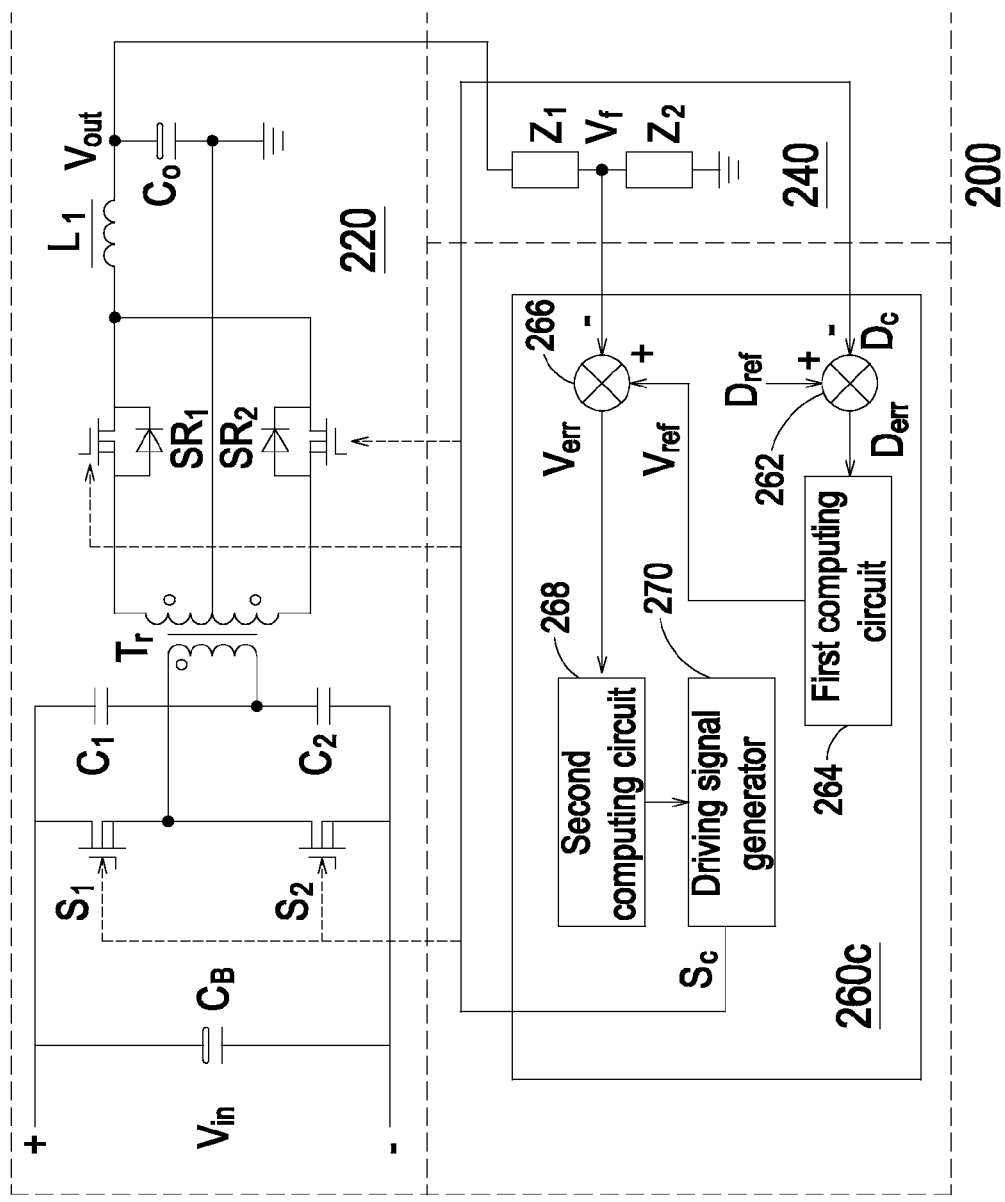
FIG. 5 is a schematic circuit diagram illustrating a third exemplary power converter used in the power supply system of FIG. 1.

FIG. 5 is a schematic circuit diagram illustrating a third exemplary power converter used in the power supply system of FIG. 1. As shown in FIG. 5, the power converter 200 comprises a power module 220, a feedback module 240, and a control module 260c. In comparison with FIG. 2, the control module 260c is distinguished. In this embodiment, after the driving control signal $S_c$ is outputted from the control module 260c, the driving control signal $S_c$ is fed back to the control module 260c. The fed-back driving control signal $S_c$ is received by the first comparing circuit 262, so that the corresponding duty cycle is retrieved from the driving control signal. Moreover, the duty cycle $D_c$ retrieved from the driving signal generator 270 is compared with the reference duty cycle value $D_{ref}$ by the first comparing circuit 262.

The operations of the control module 260c and the relationship between the control module 260c, the power module 220 and the feedback module 240 are similar to those of FIG. 2, and are not redundantly described herein. The operations of the components of the control module 260c and the relationships between these components are similar to those of FIG. 2, and are not redundantly described herein.

Figure 6:
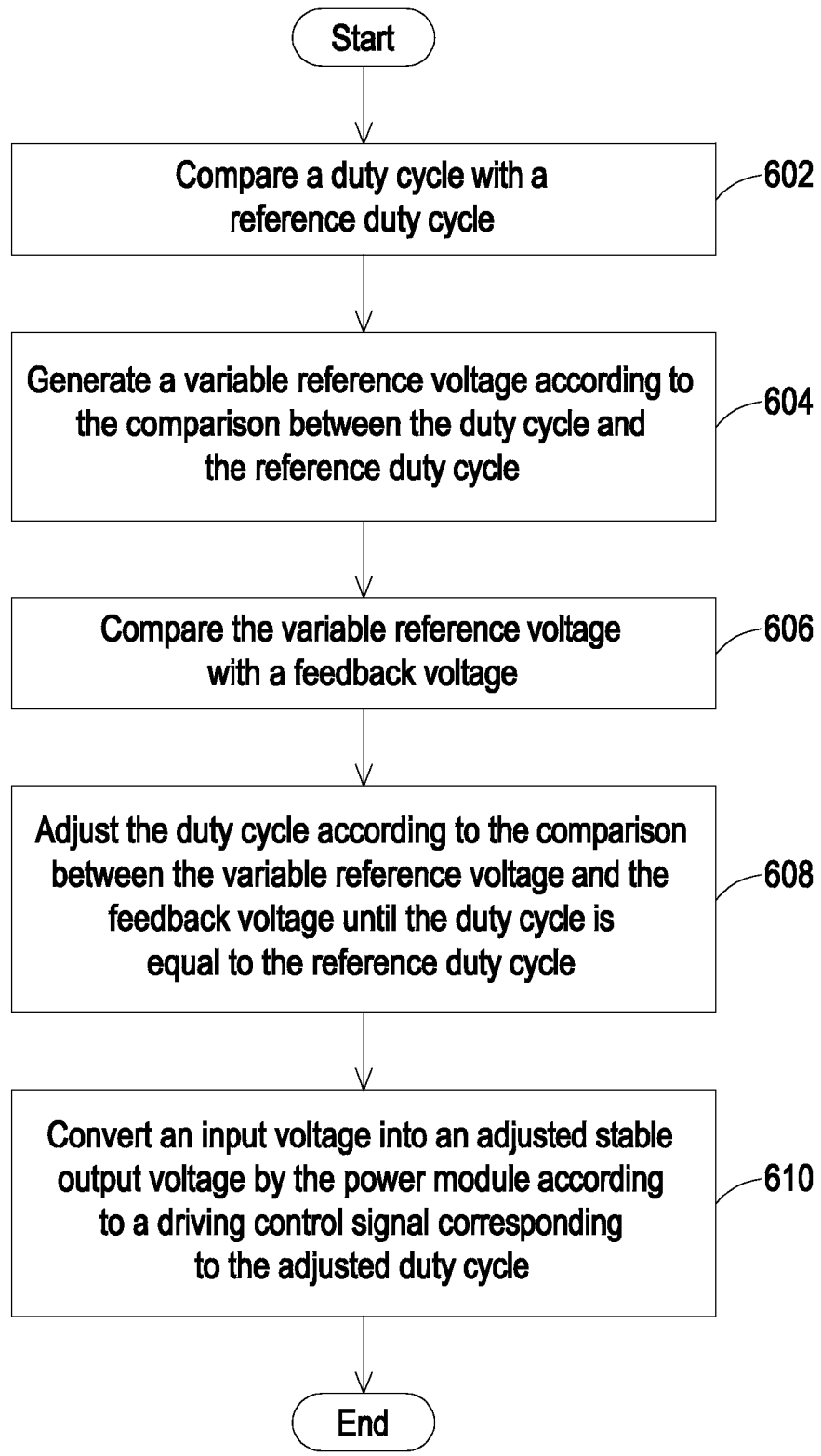
FIG. 6 is a flowchart illustrating a voltage regulating method according to an embodiment of the present invention.

FIG. 6 is a flowchart illustrating a voltage regulating method according to an embodiment of the present invention. Hereinafter, the voltage regulating method will be illustrated with reference to the circuit diagram of FIG. 2 and the flowchart of FIG. 6. Firstly, a duty cycle $D_c$ is compared with a reference duty cycle value $D_{ref}$ (Step 602). Then, a variable reference voltage $V_{ref}$ is generated according to the comparison between the duty cycle $D_c$ and the reference duty cycle value $D_{ref}$ (Step 604). Then, the variable reference voltage $V_{ref}$ is compared with a feedback voltage $V_f$ (Step 606). Then, according to the comparison between the variable reference voltage $V_{ref}$ and the feedback voltage $V_f$, the duty cycle $D_c$ is adjusted until the duty cycle $D_c$ is equal to the reference duty cycle value $D_{ref}$ (Step 608). Then, according to a driving control signal $S_c$ corresponding to the adjusted duty cycle $D_c$, an input voltage $V_{in}$ is converted into an adjusted stable output voltage by the power module 220.

In an embodiment of the voltage regulating method, the duty cycle $D_c$ is generated and adjusted by the second computing circuit 268.

In an embodiment of the voltage regulating method, as the input voltage $V_{in}$ is changed, the variable reference voltage $V_{ref}$ is correspondingly adjusted. In particular, as the input voltage $V_{in}$ is increased, the variable reference voltage $V_{ref}$ is gradually increased, and the duty cycle $D_c$ is adjusted to be gradually increased.

In an embodiment of the voltage regulating method, the duty cycle $D_c$ is retrieved from the driving signal generator 270. As the input voltage $V_{in}$ is increased, the variable reference voltage $V_{ref}$ is gradually increased, and the duty cycle $D_c$ is adjusted to be gradually increased.

In an embodiment of the voltage regulating method, the duty cycle $D_c$ is retrieved from the driving control signal $S_c$. After the driving control signal $S_c$ is outputted from the control module 260c, the driving control signal $S_c$ is fed back to the control module 260c and received by the first comparing circuit 262 (see FIG. 5). As the input voltage $V_{in}$ is increased, the variable reference voltage $V_{ref}$ is gradually increased, and the duty cycle $D_c$ is adjusted to be gradually increased.

Unless specifically stated, the steps of the voltage regulating method of the above embodiment may be varied according to the practical requirements. The flowchart of the voltage regulating method of FIG. 6 is presented herein for purpose of illustration and description only.

From the above descriptions, the present invention provides a power supply system, a power converter, and a voltage regulating method. As the input voltage is changed, the output voltage is gradually adjusted. Consequently, the output inductor is subjected to a reduced volt-second value (V×t). Since the output inductor does not need to have a large-sized magnetic core or more winding turns, the power density of the power module is increased, and the efficiency of the power converter is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power converter, comprising:
   a power module for converting an input voltage into an output voltage;
   a feedback module electrically connected with said power module for generating a feedback voltage according to said output voltage; and
   a control module electrically connected with said feedback module and said power module for comparing a reference duty cycle value with a duty cycle, generating a variable reference voltage according to the comparison between said reference duty cycle value and said duty cycle, comparing said variable reference voltage with said feedback voltage, and adjusting said duty cycle according to the comparison between said variable reference voltage and said feedback voltage, wherein said control module comprises:
   a first comparing circuit for comparing said reference duty cycle value with said duty cycle, thereby generating an error duty cycle;
   a first computing circuit electrically connected with said first comparing circuit for computing said error duty cycle, thereby generating and adjusting said variable reference voltage;
   a second comparing circuit electrically connected with said first computing circuit and said feedback module for comparing said variable reference voltage with said feedback voltage, thereby generating an error voltage;
   a second computing circuit electrically connected with said second comparing circuit for computing said error voltage, thereby generating and adjusting said duty cycle; and
   a driving signal generator electrically connected with said second computing circuit and said power module for receiving said adjusted duty cycle from said second computing circuit and generating a driving control signal corresponding to said adjusted duty cycle.

2. The power converter according to claim 1, wherein as said input voltage is changed, said variable reference voltage is adjusted by said control module, said duty cycle is correspondingly adjusted by said control module, and a driving control signal corresponding to said adjusted duty cycle is generated by said control module so as to control said power module.

3. The power converter according to claim 1, wherein said first comparing circuit is electrically connected with said second computing circuit for receiving said duty cycle from said second computing circuit.

4. The power converter according to claim 1, wherein said first comparing circuit is electrically connected with said driving signal generator for retrieving said duty cycle from said driving signal generator.

5. The power converter according to claim 1, wherein after said driving control signal for controlling said power module is outputted from said control module, said driving control signal is fed back to said control module, wherein said fed-back driving control signal is received by said first comparing circuit, so that said corresponding duty cycle is retrieved from said driving control signal.

6. The power converter according to claim 1, wherein as said input voltage is increased, said variable reference voltage is gradually increased, and said duty cycle is gradually increased by said control module.

7. A power supply system, comprising:
   a high voltage bus;
   a low voltage bus;
   a power converter electrically connected between said high voltage bus and said low voltage bus, and comprising a control module for comparing a reference duty cycle value with a duty cycle, generating a variable reference voltage according to the comparison between said reference duty cycle value and said duty cycle, adjusting said duty cycle according to the comparison between said variable reference voltage and a feedback voltage, and generating a driving control signal corresponding to said adjusted duty cycle, thereby adjusting an output voltage from said power converter, wherein said control module comprises:
   a first comparing circuit for comparing said reference duty cycle value with said duty cycle, thereby generating an error duty cycle;
   a first computing circuit electrically connected with said first comparing circuit for computing said error duty cycle, thereby generating and adjusting said variable reference voltage;
   a second comparing circuit electrically connected with said first computing circuit and said feedback module for comparing said variable reference voltage with said feedback voltage, thereby generating an error voltage;
   a second computing circuit electrically connected with said second comparing circuit for computing said error voltage, thereby generating and adjusting said duty cycle; and
   a driving signal generator electrically connected with said second computing circuit for receiving said adjusted duty cycle from said second computing circuit and generating said driving control signal corresponding to said adjusted duty cycle; and
   a plurality of supply voltage generation circuits electrically connected with each other in parallel and electrically connected to said low voltage bus for converting said output voltage into respective supply voltages, thereby providing to corresponding loads.

8. The power supply system according to claim 7, wherein said first comparing circuit is electrically connected with said second computing circuit for receiving said duty cycle from said second computing circuit.

9. The power supply system according to claim 7, wherein said first comparing circuit is electrically connected with said driving signal generator for retrieving said duty cycle from said driving signal generator.

10. The power supply system according to claim 7, wherein after said driving control signal is outputted from said control module, said driving control signal is fed back to said control module, wherein said fed-back driving control signal is received by said first comparing circuit, so that said corresponding duty cycle is retrieved from said driving control signal.

11. The power supply system according to claim 7, wherein as an input voltage of said power converter is changed, said variable reference voltage is adjusted by said control module, wherein as said input voltage is increased, said variable reference voltage is increased, said duty cycle is gradually increased by said control module, and said output voltage is gradually increased according to said driving control signal.

* * * * *